US010239095B2

(12) United States Patent
Shereck

(10) Patent No.: US 10,239,095 B2
(45) Date of Patent: Mar. 26, 2019

(54) GRILL BRUSH ASSEMBLY WITH REMOVABLE BRUSH

(71) Applicant: Douglas C. Shereck, Grafton, ND (US)

(72) Inventor: Douglas C. Shereck, Grafton, ND (US)

(73) Assignee: Douglas C. Shereck, Grafton, ND (US)

( * ) Notice: Subject to any disclaimer, the term of this patent is extended or adjusted under 35 U.S.C. 154(b) by 210 days.

(21) Appl. No.: 15/264,402

(22) Filed: Sep. 13, 2016

(65) Prior Publication Data

US 2018/0071790 A1    Mar. 15, 2018

(51) Int. Cl.
*B08B 1/00* (2006.01)
*A47J 37/07* (2006.01)
*A46D 1/00* (2006.01)
*A46B 5/00* (2006.01)
*B08B 1/04* (2006.01)

(52) U.S. Cl.
CPC ............ *B08B 1/002* (2013.01); *A46B 5/0012* (2013.01); *A46B 5/0095* (2013.01); *A46D 1/0207* (2013.01); *A47J 37/0786* (2013.01); *B08B 1/04* (2013.01)

(58) Field of Classification Search
CPC ..... B08B 1/002; A46B 5/0012; A56B 5/0095; A46D 1/0207; A47J 37/0786
USPC .......................................................... 15/106
See application file for complete search history.

(56) References Cited

U.S. PATENT DOCUMENTS

| | | | | |
|---|---|---|---|---|
| 2,820,977 A * | 1/1958 | Carr ...................... | A47L 11/161 | 15/106 |
| 3,434,175 A * | 3/1969 | Bray ...................... | A47J 37/06 | 15/104.94 |
| 3,937,584 A | 2/1976 | Freeman | | |
| 4,146,943 A * | 4/1979 | Wertheimer ............ | A47L 13/08 | 15/111 |
| 4,365,380 A * | 12/1982 | Fassler ..................... | A46B 9/02 | 15/104.04 |
| 5,373,600 A * | 12/1994 | Stojanovski ............ | A47L 13/34 | 15/111 |

(Continued)

OTHER PUBLICATIONS

Weber: Bamboo Grill Brush w/Replaceable Head, 2 pages, available at https://store.weber.com/accessories/category/clean/grill-brushes/1539.

(Continued)

*Primary Examiner* — Weilun Lo
(74) *Attorney, Agent, or Firm* — Artegis Law Group, LLP

(57) ABSTRACT

Embodiments set forth a cleaning brush handle that includes a head region that includes one or more brush apertures, where each brush aperture is configured to receive one replaceable brush. The brush apertures may be orthogonal to the brush handle, or, in the alternative, may be at an angle in the longitudinal direction, the transversal direction, or both. The brush includes a nominally ¼" round or hex-shaped shank that is inserted into the brush aperture. The brushes are held in place via a suitable mounting mechanism, such as a threaded insert that receives a thumbscrew or a bushing with a threaded hole that receives a thumbscrew. The mounting mechanism provides for easy insertion, rotation, removal, and replacement of the brushes. The mounting mechanism provides for rotating the brushes, in small increments, through a 360° range, for more even brush wear and longer brush life, relative to conventional cleaning brushes.

17 Claims, 5 Drawing Sheets

(56) References Cited

U.S. PATENT DOCUMENTS

| | | | | |
|---|---|---|---|---|
| 5,471,700 | A * | 12/1995 | Pereira | A47L 13/022 15/143.1 |
| 5,568,668 | A * | 10/1996 | Margolin | A46B 5/0095 15/143.1 |
| 6,049,935 | A * | 4/2000 | Zemel | A46B 17/08 15/111 |
| 6,216,306 | B1 * | 4/2001 | Esterson | A46B 5/02 15/111 |
| 6,393,647 | B1 * | 5/2002 | Libman | A46B 5/0095 15/145 |
| 6,438,784 | B1 * | 8/2002 | Yu | A46B 7/04 15/105 |
| 6,443,646 | B1 * | 9/2002 | MacDonald | A46B 11/00 401/25 |
| 6,755,428 | B2 | 6/2004 | MacLean | |
| 6,966,094 | B1 | 11/2005 | Rigakos | |
| 7,047,590 | B2 | 5/2006 | Neal et al. | |
| 9,210,993 | B2 | 12/2015 | Gonzalez et al. | |
| 2003/0145406 | A1 | 8/2003 | Wang | |
| 2005/0160544 | A1 | 7/2005 | Geller | |
| 2006/0207042 | A1 * | 9/2006 | Di Paolo | A46B 5/0095 15/111 |
| 2007/0136971 | A1 * | 6/2007 | Dickman | A45D 34/04 15/209.1 |
| 2007/0231054 | A1 * | 10/2007 | Wales | A46B 5/0008 401/280 |
| 2008/0178404 | A1 * | 7/2008 | Wales | A46B 11/0013 15/106 |
| 2008/0222822 | A1 * | 9/2008 | Cobabe | A46B 5/0075 15/28 |
| 2009/0031519 | A1 * | 2/2009 | Carpenter | A47J 37/0786 15/236.01 |
| 2009/0056748 | A1 * | 3/2009 | Wales | A46B 15/0081 134/6 |
| 2010/0067972 | A1 * | 3/2010 | Ashworth | A47L 13/34 401/270 |
| 2012/0060864 | A1 * | 3/2012 | Nowakowski | A46B 5/0062 134/6 |
| 2013/0061411 | A1 * | 3/2013 | Witzel | A47L 17/00 15/106 |
| 2013/0205519 | A1 * | 8/2013 | Steele | B25F 3/00 15/21.1 |
| 2014/0331424 | A1 * | 11/2014 | Gonzalez | A46B 3/18 15/111 |
| 2015/0272311 | A1 | 10/2015 | Flannery | |
| 2017/0042320 | A1 * | 2/2017 | Potocka | A46B 15/0081 |
| 2017/0188696 | A1 * | 7/2017 | Neal | A46B 15/0081 |

OTHER PUBLICATIONS

BBQ Tools: Tool Wizard Grill Brush, 3 pages, available at https://www.toolwizard.com/index.cfm/product/30/tool-wizard-grill-brush.htm.

* cited by examiner

GRILL BRUSH ASSEMBLY WITH REMOVABLE BRUSH

BACKGROUND OF THE INVENTION

Field of the Invention

Embodiments of the present invention relate generally to cleaning brushes and, more specifically, to a grill brush assembly with removable brush.

Description of the Related Art

Cleaning brushes are typically employed to scrub oil, grease, and food remnants from cooking surfaces, such as the grill grates of an indoor or outdoor grill. In general, such cleaning brushes consist of a handle with a brush head on one end, where metal bristles are vertically embedded into the brush head. These vertically embedded bristles are typically distributed in a sparse grid across the surface of the brush head. The bristles of the cleaning brush are applied to the grill grates in a back-and-forth motion, typically, while the grill is warm, in order to remove the oil, grease, and food remnants. After cleaning the grill grates, the grill is ready for grilling various food items. Regular brushing of the grill grates serves to improve the taste of food cooked on the grill and reduces the risk of flare-ups and fires due to ignition of residual oil, grease, and food.

One drawback of conventional cleaning brushes is that the brush bristles are typically not densely distributed, and therefore, are relatively poor at cleaning grill grates. As a result, significant pressure and scrubbing time are often needed to sufficiently clean the grill grates. Further, scrubbing the grills in a unidirectional back-and-forth motion wears the sparsely distributed, vertically oriented bristles quickly and unevenly. As a result, the effective brush life of current cleaning brushes is relatively short, particularly in applications where a grill is frequently employed for cooking. Once the bristles of the cleaning brush are worn, the entire cleaning brush is discarded, and a new cleaning brush is purchased.

One potential solution to this problem is to purchase a cleaning brush with a proprietary replaceable brush head. Once the brush head is worn, the brush head is removed from the handle and a new replacement brush head is installed on the existing handle. One potential drawback with existing brushes with replaceable heads is that the replacement brush heads typically employ a proprietary design that is configured to fit only a specific type or model of brush handle. Therefore, a replacement head made by one manufacturer is unlikely to fit the handle made by a different manufacturer. Further, retail stores that sell brushes with replaceable brush heads do not always carry the replacement heads themselves. In addition, replacement heads are often expensive relative to the cost of a new complete brush. As a result, even when a cleaning brush with a replaceable head is purchased, the entire brush is often thrown away once the bristles are worn.

Another drawback of conventional cleaning brushes is that only a relatively small portion of the sparsely distributed, vertically oriented strands make contact with the grill grates. Many of the bristles fall between the bars of the grill grate, making no contact at all with the grill grate itself. Further, because the bristles are vertically oriented, certain portions of the grill grates, such as the sides of the grill grate bars, make no contact with the bristles or contact the only the side of the bristles. As a result, little or no pressure is applied to these surfaces during cleaning, leading to ineffective cleaning of these portions of the grill grates.

As the foregoing illustrates, what is needed in the art is a more effective cleaning brush for cleaning grill grates and other cooking surfaces.

SUMMARY OF THE INVENTION

Various embodiments of the present invention set forth a grill brush handle that includes a first end, and a second end that includes one or more apertures each configured to receive a brush head.

Various embodiments of the present invention set forth a grill brush assembly, that includes a grill brush handle that further includes a first end, and a second end that includes one or more apertures each configured to receive a brush head. The a grill brush assembly further includes a first brush configured to be inserted into a first aperture included in the one or more apertures, and a first fastener configured to retain the first brush in the first aperture.

Other embodiments of the present invention include, without limitation, a cleaning brush assembly for performing one or more aspects of the disclosed approach, as well as a method for performing one or more aspects of the disclosed techniques.

At least one advantage of the disclosed approach is that replacement brush heads are readily available at a low price, relative to conventional cleaning brushes with replaceable heads. Another advantage of the disclosed approach is that, because the brush heads are rotatable and have a relatively high densely of metallic bristles, the effectiveness and the brush life of the brush head is increased relative to conventional cleaning brushes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
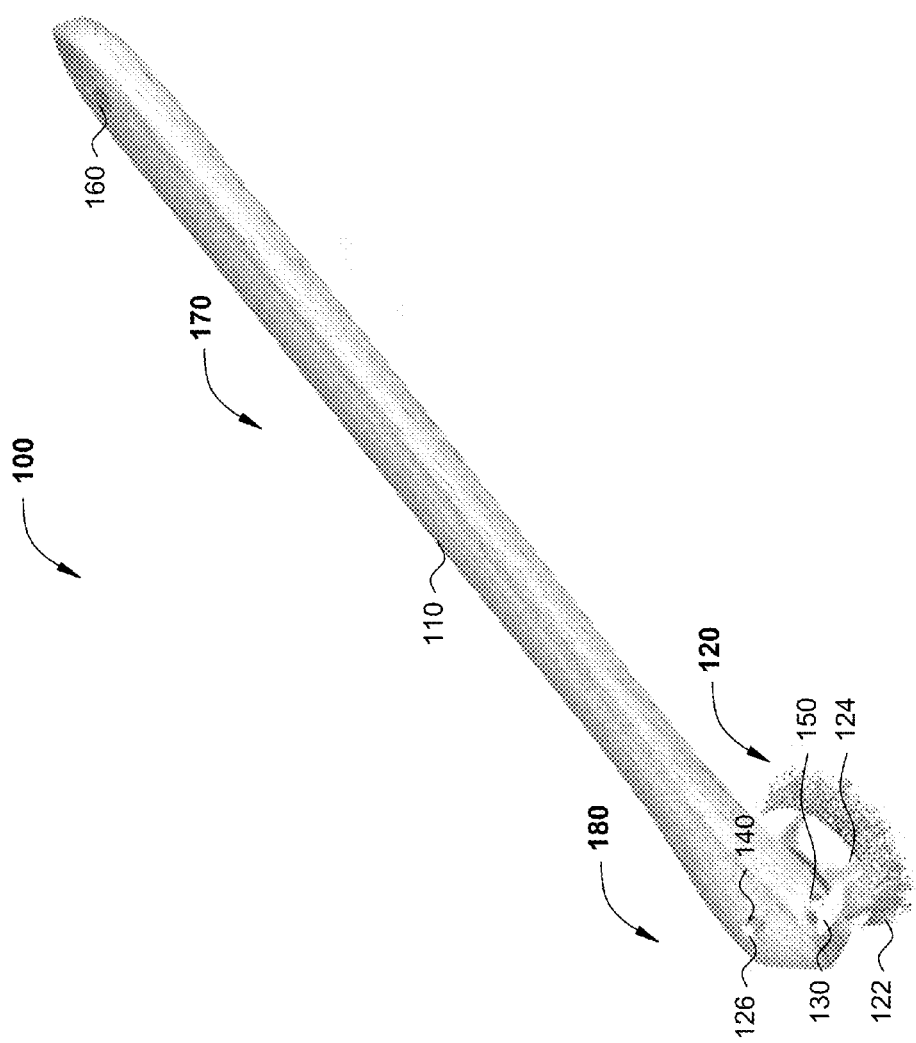
FIG. 1 illustrates a grill brush assembly, according to various embodiments of the invention.

FIG. 1 illustrates a grill brush assembly 100, according to various embodiments of the invention. As shown, the grill brush assembly 100 includes, without limitation, a handle 110, a brush 120, and a thumbscrew 130. Further, the handle 110 includes a brush aperture 140 and a threaded insert 150 disposed within a head region 180 of the handle 110. Further, the handle 110 includes a storage aperture 160 disposed within a shank 170 of the handle 110.

In various embodiments, the handle 110 may be of any suitable dimensions, within the scope of the present invention. In one example, and without limitation, the handle could be approximately 18-22" in length and approximately ¾" thick. The handle 110 could be approximately 1¼" in width along the shank 170 and approximately 2" in width in the head region 180 near the brush aperture 140. The head region 180 could be approximately 2" in length in the longitudinal direction. The handle 110 may be composed of any technically feasible material, including, without limitation, wood, plastic, bamboo, or metal.

The brush aperture 140 is configured to receive the brush shank 126 of the brush 120. The brush aperture 140 has any technically feasible diameter in order to receive the brush shank 126 of the brush 120. In one example, and without limitation, the brush aperture 140 is 9/32" in diameter. In some embodiments, the brush aperture 140 may be disposed orthogonally to the handle 110. Alternatively, in some embodiments, the brush aperture 140 may be disposed at some other angle in the longitudinal direction of the handle 110. This angle may be any technically feasible angle. In one example, the angle of the brush aperture 140 may be at a 15° angle from perpendicular relative to the longitudinal direction of the handle 110. In some embodiments, the angle may be adjustable within a certain range, such as 10° to 20°. When the brush 120 is installed into the brush aperture 140, the angle causes the brush 120 to tilt forward or backward relative to the longitudinal direction of the handle 110, which may apply more force between the brush 120 and the grill grates during cleaning operations, and, correspondingly, may reduce physical stress on the user.

The threaded insert 150 is configured to receive the thumbscrew 130. The threaded insert 150 may be any technically feasible fastener that is capable of receiving the thumbscrew 130, including, without limitation, a tee nut or an EZ-lock threaded insert. The threaded insert 150 may be a separate component that is screwed, swaged, or glued into an opening within the head region 180 of the handle 110. The threaded insert 150 may be composed of any material that is suitable to receive and retain the thumbscrew 130. Alternatively, a threaded hole can be may be molded or machined into the head region 180 of certain types of handles 110, such as plastic or metal handles, respectively, thereby eliminating the need for a threaded insert 150.

The storage aperture 160 provides for storage of the grill brush assembly 110 when not in use. In some embodiments, the storage aperture 160 has a diameter suitable for installing and hanging the storage aperture 160 onto a utensil hook, as is commonly available on many grills and other outdoor cookware. In some embodiments, the storage aperture 160 has a diameter suitable for receiving a strap (not explicitly shown) that is suitable for installing and hanging the storage aperture 160 onto such a utensil hook. In one example, and without limitation, the storage aperture 160 is ⅜" in diameter. The strap may be composed of any technically feasible material, including, without limitation, leather, nylon, or twine.

The brush 120, also referred to herein as a brush head, is configured to be mounted into the brush aperture 140. As the brush 120 wears from use, the brush 120 may be rotated in small angle increments within the brush aperture 140 through a range of 360°. As a result, the brush 120 may be rotated as the brush 120 wears with use, thereby extending the brush life of the brush 120. To rotate the brush 120, the thumbscrew 130 is slightly loosened, the brush 120 is rotated within the brush aperture 140, and the thumbscrew 130 is then tightened. In various embodiments, the brush 120 may be of a type that is suitable for attachment to a drill, cordless driver, or similar tool. In some embodiments, the brush 120 may be of a type that is typically referred to as a cup brush. Such cup brushes are commonly available and may be purchased from various sources, including, without limitation, hardware stores, department stores, and online stores. The brush 120 includes, without limitation, bristles 122, a cup 124, and a brush shank 126.

The bristles 122 may be of any suitable density, including, without limitation, sparse, dense, or very dense. Further, the bristles 122 may be of any suitable thickness, including, without limitation, fine, medium, or coarse. Further still, the bristles 122 may be made of any suitable material, including, without limitation, nylon, brass, or steel. The bristle density, thickness, and material may be selected based on various factors, such as the type of grill grate and temperature of use. Sparse bristles with fine to medium thickness may be selected for grill grates that are more easily scratched or damaged, such as ceramic grill grates or metal grill grates composed of small diameter rods. Dense or very dense bristles with medium to coarse thickness may be selected for more robust grill grates, such as metal grill grates composed of larger diameter rods. Similarly, nylon or brass bristles may be selected for grill grates that are more easily scratched or damaged, such as ceramic grill grates or metal grill grates composed of small diameter rods. Steel bristles may be selected for more robust grill grates, such as metal grill grates composed of larger diameter rods.

The cup 124 retains the bristles 122, provides a protective cover for the bristles 122, and couples the bristles 122 to the brush shank 126. The brush shank 126 may be of any technically feasible diameter and cross-sectional shape. For example, and without limitation, the brush shank 126 could be nominally ¼" in diameter and could have a circular or hexagonal cross-sectional shape. However, the brush shank 126 may be of any other technically feasible diameter within the scope of this invention, including, without limitation, 3/16", 5/16", and ⅜" diameter. Likewise, the brush shank 126 may be of any other technically feasible cross-sectional shape within the scope of this invention, including, without limitation, triangular, square, and flat cross-section.

The thumb screw 130 is configured to be screwed or otherwise inserted into the threaded insert 150. When the thumbscrew 130 is fully inserted into the threaded insert 150, the end of the thumbscrew 130 contacts the brush shank 126, thereby retaining the brush 120 within the head region 180 of the handle 110. The thumbscrew 130 provides for insertion, rotation, removal, and replacement of the brush 120 without the need for any specialized tools. In various embodiments, fasteners other than a thumbscrew 130 may be used, including, without limitation, a hex head set screw, a slotted head set screw, a Philips head set screw, and a torx head set screw. In such embodiments, a special tool may be required to tighten and loosen the screw within the threaded insert 150.

Figure 2:
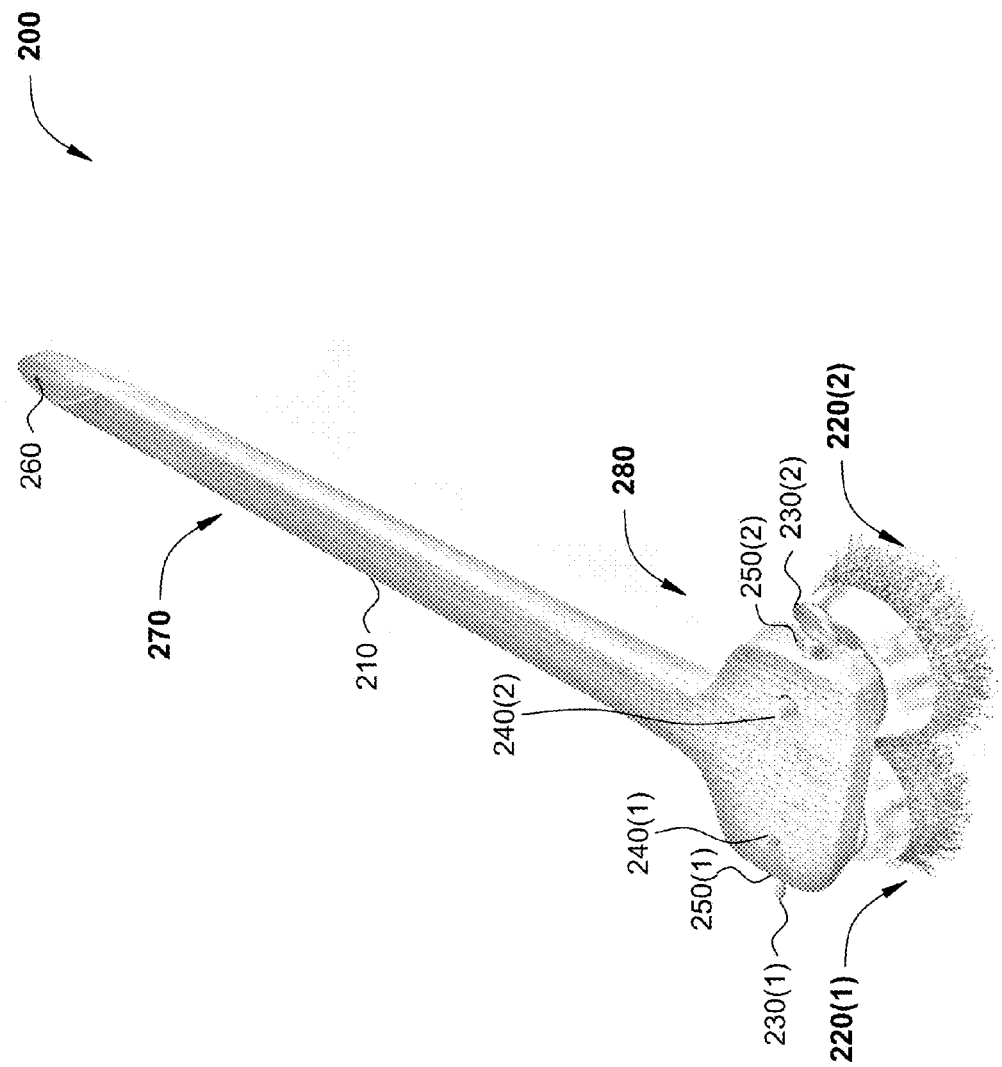
FIG. 2 illustrates a grill brush assembly, according to other various embodiments of the invention.

FIG. 2 illustrates a grill brush assembly 200, according to other various embodiments of the invention. As shown, the grill brush assembly 200 includes, without limitation, a handle 210, brushes 220(1) and 220(2), and thumbscrews 230(1) and 230(2). Further, the handle 210 includes brush apertures 240(1) and 240(2) and threaded inserts 250(1) and 250(2) disposed within a head region 280 of the handle 210.

Further, the handle 210 includes a storage aperture 260 disposed within a shank 270 of the handle 210.

The handle 210, brushes 220(1) and 220(2), thumbscrews 230(1) and 230(2), brush apertures 240(1) and 240(2), threaded inserts 250(1) and 250(2), and storage aperture 260 function substantially the same as described in conjunction with analogous components as illustrated in FIG. 1, except as further described below.

In various embodiments, the handle 210 may be of any suitable dimensions such that that handle 210 can receive multiple brushes 220(1) and 220(2), within the scope of the present invention. In one example, and without limitation, the handle could be approximately 18-22" in length and approximately ¾" thick. The handle 210 could be approximately 1¼" in width along the shank 270 and approximately 4" in width in the head region 280 near the brush apertures 240(1) and 240(2). The head region 280 could be approximately 2½" in length in the longitudinal direction.

The brush apertures 240(1) and 240(2) are configured to receive the brushes 220(1) and 220(2), respectively. The thumbscrews 230(1) and 230(2) are inserted into the threaded inserts 250(1) and 250(2), respectively, until the thumbscrews 230(1) and 230(2) contact the brush shanks of the brushes 220(1) and 220(2), respectively.

In some embodiments, the brush apertures 240(1) and 240(2) may be disposed orthogonally to the handle 210. Alternatively, in some embodiments, the brush apertures 240(1) and 240(2) may be disposed at some other angle in the longitudinal direction of the handle 210. This angle may be any technically feasible angle. In one example, the angle of the brush apertures 240(1) and 240(2) may be at a 15° angle from perpendicular relative to the longitudinal direction of the handle 210. In some embodiments, the angle may be adjustable within a certain range, such as 10° to 20°. When the brushes 220(1) and 220(2) are installed into the brush apertures 240(1) and 240(2), the angle causes the brushes 220(1) and 220(2) to tilt forward or backward relative to the longitudinal direction of the handle 210, which may apply more force between the brushes 220(1) and 220(2) and the grill grates during cleaning operations, and, correspondingly, may reduce physical stress on the user.

Alternatively or in addition, in some embodiments, the brush apertures 240(1) and 240(2) may be disposed at some other angle in the transversal direction of the handle 210. This angle may be any technically feasible angle. In one example, the angle of the brush apertures 240(1) and 240(2) may be at a 25° angle from perpendicular relative to the transversal direction of the handle 210. In some embodiments, the angle may be adjustable within a certain range, such as 20° to 30°. When the brushes 220(1) and 220(2) are installed into the brush apertures 240(1) and 240(2), the angle causes the brushes 220(1) and 220(2) to tilt to the left and to the right, respectively, relative to the transversal direction of the handle 210, which may apply more force between the brushes 220(1) and 220(2) and the grill grates during cleaning operations, and, correspondingly, may reduce physical stress on the user.

Figure 3:
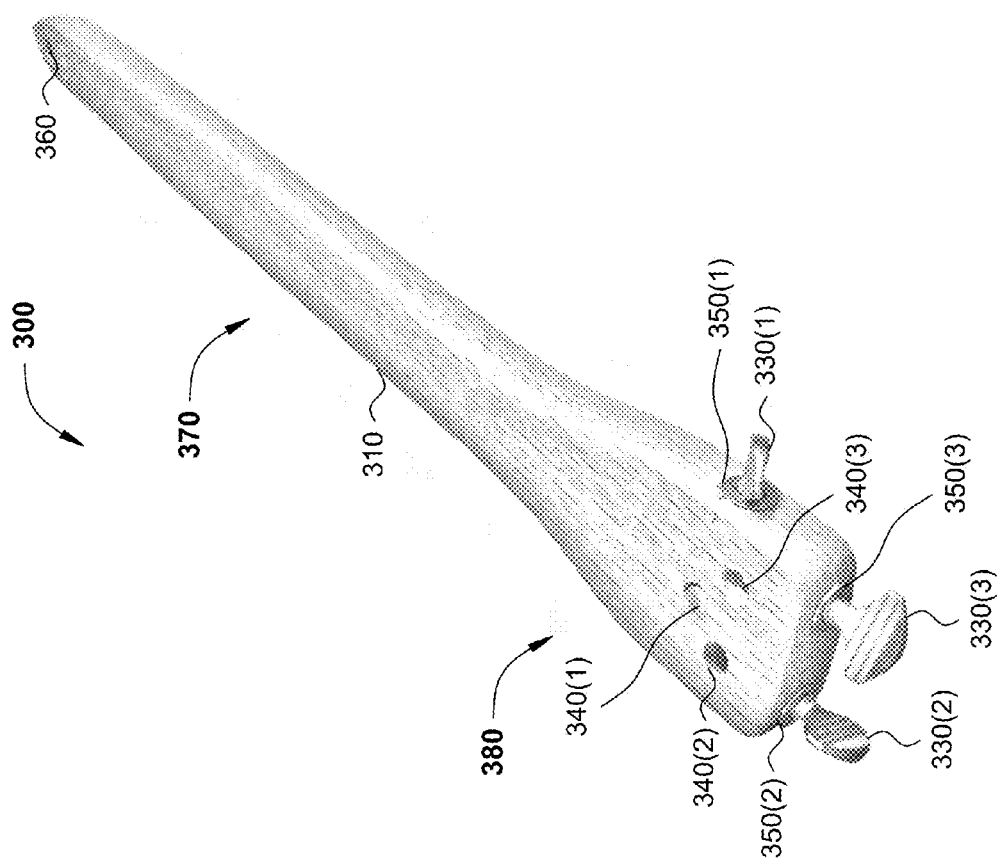
FIG. 3 illustrates a grill brush assembly, according to yet other various embodiments of the invention.

FIG. 3 illustrates a grill brush assembly 300, according to yet other various embodiments of the invention. As shown, the grill brush assembly 300 includes, without limitation, a handle 310, brushes (not explicitly shown), and thumbscrews 330(1), 330(2), and 330(3). Further, the handle 310 includes brush apertures 340(1), 340(2), and 340(3) and threaded inserts 350(1), 350(2), and 350(3) disposed within a head region 380 of the handle 310. Further, the handle 310 includes a storage aperture 360 disposed within a shank 370 of the handle 310.

The handle 310, brushes, thumbscrews 330(1), 330(2), and 330(3), brush apertures 340(1), 340(2), and 340(3), threaded inserts 350(1), 350(2), and 350(3), and storage aperture 360 function substantially the same as described in conjunction with analogous components as illustrated in FIGS. 1-2, except as further described below.

In various embodiments, the handle 310 may be of any suitable dimensions such that that handle 310 can receive multiple brushes, within the scope of the present invention. In one example, and without limitation, the handle could be approximately 18-22" in length and approximately ¾" thick. The handle 310 could be approximately 1¼" in width along the shank 370 and approximately 2" in width in the head region 380 near the brush apertures 340(1), 340(2), and 340(3). The head region 380 could be approximately 2" in length in the longitudinal direction.

The brush apertures 340(1), 340(2), and 340(3) are configured to receive the brushes. For a one-brush configuration, a brush is inserted into brush aperture 340(1). For a two-brush configuration, a brush is inserted into each of brush apertures 340(2) and 340(3). The thumbscrews 330(1), 330(2), and 330(3) are inserted into the threaded inserts 350(1), 350(2), and 350(3), respectively, until the thumbscrews 330(1), 330(2), and 330(3) contact the brush shanks of the installed brushes. The brush apertures 340(1), 340(2), and 340(3) may be placed in any technically feasible location on the head region 380 of the handle 310. In one example, and without limitation, the top of brush aperture 340(1) could be centered between the left and right edges of the head region 380 in the transversal direction and 1" from the front of the head region 380 in the longitudinal direction. The top of brush apertures 340(2) and 340(3) could be ⅝" from the left and right edges of the head region 380, respectively, in the transversal direction and 3/1" from the front of the head region 380 in the longitudinal direction.

In some embodiments, the brush 340(1), 340(2), and 340(3) may be disposed orthogonally to the handle 310. Alternatively, in some embodiments, the brush apertures 340(1), 340(2), and 340(3) may be disposed at some other angle in the longitudinal direction of the handle 310. This angle may be any technically feasible angle. In one example, the angle of the brush apertures any one or more of 340(1), 340(2), and 340(3) may be at a 15° angle from perpendicular relative to the longitudinal direction of the handle 210. In some embodiments, the angle may be adjustable within a certain range, such as 10° to 20°. When the brushes are installed into the brush apertures 340(1), 340(2), and 340(3), the angle causes the brushes to tilt forward or backward relative to the longitudinal direction of the handle 310, which may apply more force between the brushes and the grill grates during cleaning operations, and, correspondingly, may reduce physical stress on the user.

Alternatively or in addition, in some embodiments, the brush apertures 340(2) and 340(3) may be disposed at some other angle in the transversal direction of the handle 310. This angle may be any technically feasible angle. In one example, the angle of the brush apertures 340(2) and 340(3) may be at a 25° angle from perpendicular relative to the transversal direction of the handle 310. In some embodiments, the angle may be adjustable within a certain range, such as 20° to 30°. When the brushes are installed into the brush apertures 340(2) and 340(3), the angle causes the brushes to tilt to the left and to the right, respectively, relative to the transversal direction of the handle 310, which may apply more force between the brushes and the grill grates during cleaning operations, and, correspondingly, may reduce physical stress on the user.

Figure 4:
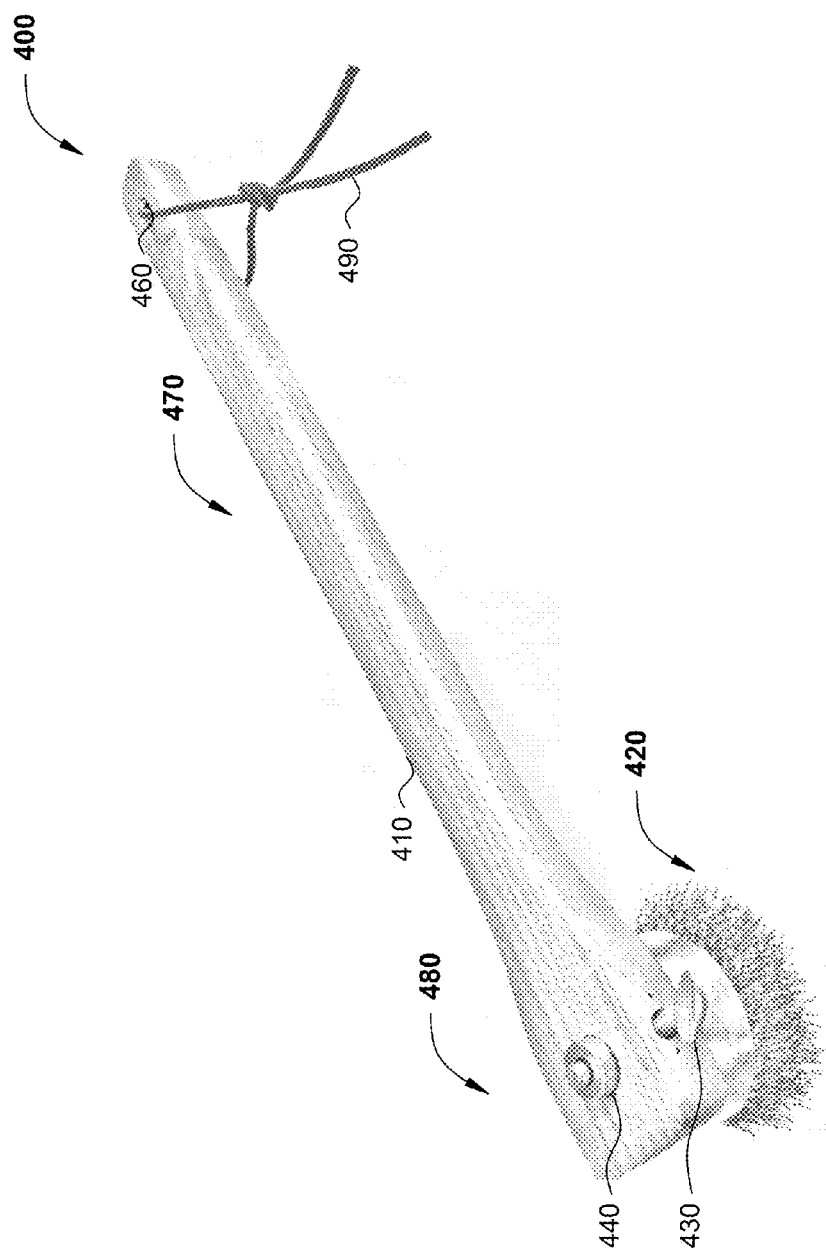
FIG. 4 illustrates a grill brush assembly, according to yet other various embodiments of the invention.

FIG. 4 illustrates a grill brush assembly 400, according to yet other various embodiments of the invention. As shown, the grill brush assembly 400 includes, without limitation, a handle 410, a brush 420, and a thumbscrew 430. Further, the handle 410 includes a bushing 440 disposed within a head region 480 of the handle 410. Further, the handle 410 includes a storage aperture 460 disposed within a shank 470 of the handle 410, where the storage aperture 460 is configured to receive a strap 490.

The handle 410, brush 420, thumbscrew 430, storage aperture 460, and strap 490 function substantially the same as described in conjunction with analogous components as illustrated in FIGS. 1-3 except as further described below.

In various embodiments, the handle 410 may be of any suitable dimensions, within the scope of the present invention. In one example, and without limitation, the handle could be approximately 18-22" in length and approximately ¾" thick. The handle 410 could be approximately 1¼" in width along the shank 470 and approximately 2" in width in the head region 480 near the bushing 440. The head region 480 could be approximately 2" in length in the longitudinal direction.

The bushing 440 is configured to receive the brush 420. The bushing 440 includes an integral threaded hole (not explicitly shown) that is configured to receive the thumbscrew 430, thereby eliminating the need for a threaded insert. The thumbscrew 430 is inserted into the threaded holes of the bushing 440 via an access hole bored into the handle 410, until the thumbscrew 430 contacts the brush shank of the brush 420.

In some embodiments, the bushing 440 may be disposed orthogonally to the handle 410. Alternatively, in some embodiments, the bushing 440 may be disposed at some other angle in the longitudinal direction of the handle 410. This angle may be any technically feasible angle. In one example, the angle of the bushing 440 may be at a 15° angle from perpendicular relative to the longitudinal direction of the handle 410. In some embodiments, the angle may be adjustable within a certain range, such as 10° to 20°. When the brush 420 is installed into the bushing 440, the angle causes the brush 420 to tilt forward or backward relative to the longitudinal direction of the handle 410, which may apply more force between the brush 420 and the grill grates during cleaning operations, and, correspondingly, may reduce physical stress on the user.

Figure 5:
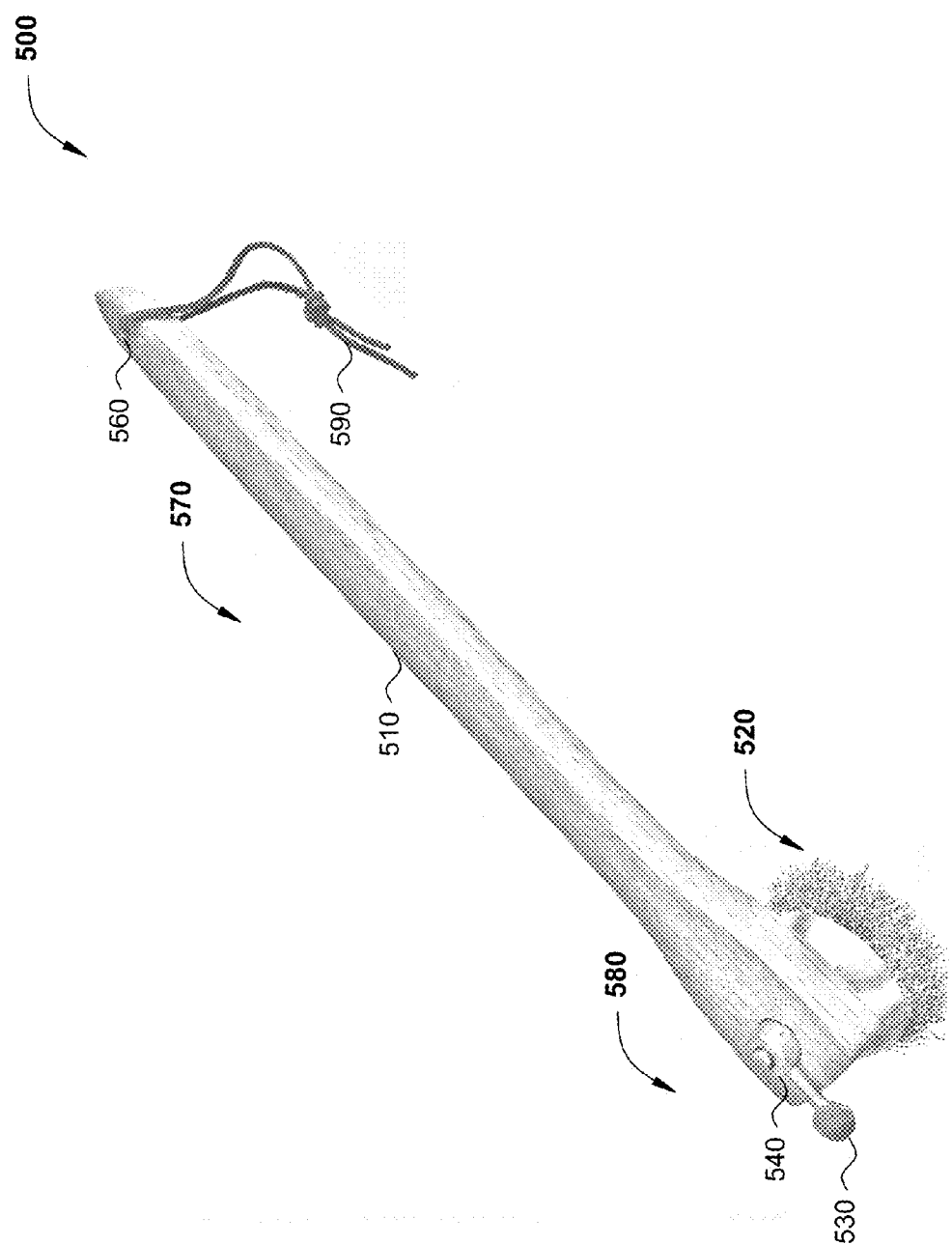
FIG. 5 illustrates a grill brush assembly, according to yet other various embodiments of the invention.

FIG. 5 illustrates a grill brush assembly 500, according to yet other various embodiments of the invention. As shown, the grill brush assembly 500 includes, without limitation, a handle 510, a brush 520, and a thumbscrew 530. Further, the handle 510 includes a bushing 540 with an integral threaded insert (not explicitly shown) disposed within a head region 580 of the handle 510. Further, the handle 510 includes a storage aperture 560 disposed within a shank 570 of the handle 510, where the storage aperture 560 is configured to receive a strap 590.

The handle 510, brush 520, thumbscrew 530, bushing 540, storage aperture 560, and strap 590 function substantially the same as described in conjunction with analogous components as illustrated in FIGS. 1-4 except as further described below.

In various embodiments, the handle 510 may be of any suitable dimensions, within the scope of the present invention. In one example, and without limitation, the handle could be approximately 18-22" in length and approximately ¾" thick. The handle 510 could be approximately 1¼" in width along the shank 570 and approximately 2" in width in the head region 580 near the bushing 540. The head region 580 could be approximately 2" in length in the longitudinal direction.

The bushing 540 is configured to receive the brush 520. The bushing 540 includes an integral threaded hole (not explicitly shown) that is configured to receive the thumbscrew 530, thereby eliminating the need for a threaded insert. The thumbscrew 530 is inserted into the threaded hole of the bushing 540 that is accessible above the top surface of the handle 510, until the thumbscrew 530 contacts the brush shank of the brush 520.

In some embodiments, the bushing 540 may be disposed orthogonally to the handle 510. Alternatively, in some embodiments, the bushing 540 may be disposed at some other angle in the longitudinal direction of the handle 510. This angle may be any technically feasible angle. In one example, the angle of the bushing 540 may be at a 15° angle from perpendicular relative to the longitudinal direction of the handle 510. In some embodiments, the angle may be adjustable within a certain range, such as 10° to 20°. When the brush 520 is installed into the bushing 540, the angle causes the brush 520 to tilt forward or backward relative to the longitudinal direction of the handle 510, which may apply more force between the brush 520 and the grill grates during cleaning operations, and, correspondingly, may reduce physical stress on the user.

It will be appreciated that the approaches shown herein are illustrative and that variations and modifications are possible. In one example, and without limitation, the head region of the handle could be fabricated separately and be made of a different material than the shank of the handle. The head region could be machined from aluminum or other suitable metal, thereby providing increased strength at the "working end" of the handle. Further, with a machine metal head region, threaded holes could be tapped or otherwise machined into the head region, thereby eliminating the need for threaded inserts. The shank could be made from a material that is less conductive of heat and more aesthetic, such as wood, bamboo, or plastic. The head region could be attached to the shank via any technically feasible approach, including, without limitation, attachment dowels, pocket screw joints, or box joints.

In sum, a cleaning brush handle includes a head region that includes one or more brush apertures, where each brush aperture is configured to receive one replaceable brush. The brush apertures may be orthogonal to the brush handle, or, in the alternative, may be at an angle in the longitudinal direction, the transversal direction, or both. The brush includes a nominally ¼" round or hex-shaped shank that is inserted into the brush aperture. The brushes are held in place via a suitable mounting mechanism, such as a threaded insert that receives a thumbscrew or a bushing with a threaded hole that receives a thumbscrew. The mounting mechanism provides for easy insertion, rotation, removal, and replacement of the brushes. The mounting mechanism provides for rotating the brushes, in small increments, through a 360° range, for more even brush wear and longer brush life, relative to conventional cleaning brushes. Further, replacement brushes are of a type that is readily and inexpensively available at hardware stores and other retail outlets. The metallic bristles embedded in the brush heads are available with fine, medium, or coarse bristles and with greater bristle density, relative to conventional cleaning brushes. The replacement brushes are available with bristles in a variety of different metals or metal alloys, enabling the selection of different brush heads for different types of cooking surfaces and applications.

At least one advantage of the disclosed approach is that replacement brush heads are readily available at a low price, relative to conventional cleaning brushes with replaceable heads. The brush heads are available with different types of metallic bristles, such as brass or steel, enabling the user to select a brush head appropriate to the particular cooking surface being cleaned.

Another advantage of the disclosed approach is that, because the brush heads are rotatable and have a relatively high densely of metallic bristles, the effectiveness and the brush life of the brush head is increased relative to conventional cleaning brushes. Further, because the brush heads are mountable at an angle in the longitudinal and/or transversal direction of the handle, the cleaning brush exhibits high pressure contact with a greater portion of the grill bars of the cooking surface relative to prior approaches. As a result, the cleaning brush more efficiently and effectively cleans the cooking surface relative to conventional cleaning brushes. In some embodiments, two brushes may be mounted side by side in order to increase the surface area covered, further increasing efficiency and effectiveness of the grill brush assembly, relative to prior approaches.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

While the preceding is directed to embodiments of the present disclosure, other and further embodiments of the disclosure may be devised without departing from the basic scope thereof, and the scope thereof is determined by the claims that follow.

What is claimed is:

1. A grill brush assembly, comprising:
   a grill brush handle, comprising:
      a first end, and
      a second end that includes at least two apertures each configured to receive a brush head;
   a first fastener configured to be inserted into a first threaded portion to retain a first brush head in a first aperture; and
   a second fastener configured to be inserted into a second threaded portion to retain a second brush head in a second aperture;
   wherein the first aperture is disposed at a first angle transverse to the grill brush handle, the second aperture is disposed at a second angle transverse to the grill brush handle, the first angle is different from the second angle, and a shank associated with the first brush head comprises a round or hexagonal cross-section.

2. The grill brush assembly of claim 1, wherein the first aperture is disposed at a first angle relative to a longitudinal direction with respect to the grill brush handle.

3. The grill brush assembly of claim 1, wherein the first aperture is configured to receive the shank of the first brush head.

4. The grill brush assembly of claim 1, wherein the first aperture intersects the first threaded portion, and the first threaded portion is associated with a threaded insert.

5. The grill brush assembly of claim 4, wherein the threaded insert is configured to receive a thumbscrew that, when inserted into the threaded insert, retains the shank of the first brush head within the first aperture.

6. The grill brush assembly of claim 4, wherein the threaded insert is configured to receive a set screw that, when inserted into the threaded insert, retains the shank of the first brush head within the first aperture.

7. The grill brush assembly of claim 4, wherein the threaded insert is fitted into the grill brush handle.

8. The grill brush assembly of claim 1, wherein the threaded portion is molded or shaped into the grill brush handle.

9. A grill brush assembly, comprising:
   a grill brush handle that includes:
      a first end, and
      a second end that includes at least two apertures each configured to receive a brush head;
   a first brush head configured to be inserted into a first aperture;
   a first fastener configured to be inserted into a first threaded portion to retain the first brush head in the first aperture;
   a second brush head configured to be inserted into a second aperture; and
   a second fastener configured to be inserted into a second threaded portion to retain the second brush head in the second aperture;
   wherein the first aperture is disposed at a first angle transverse to the grill brush handle, the second aperture is disposed at a second angle transverse to the grill brush handle, the first angle is different from the second angle, and a shank associated with the first brush head comprises a round or hexagonal cross-section.

10. The grill brush assembly of claim 9, wherein the first aperture is disposed at a first angle of 15°±2° relative to a longitudinal direction with respect to the grill brush handle.

11. The grill brush assembly of claim 9, wherein the first aperture is disposed at a first angle of 22°±2° relative to a transversal direction with respect to the grill brush handle.

12. The grill brush assembly of claim 9, wherein the first brush head comprises brass or steel bristles.

13. The grill brush assembly of claim 9, wherein the first threaded portion is associated a bushing.

14. The grill brush assembly of claim 13, wherein the bushing is configured to receive a thumbscrew that, when inserted into the bushing, retains the shank of the first brush head within the bushing.

15. The grill brush assembly of claim 13, wherein the bushing is configured to receive a set screw that, when inserted into the bushing, retains the shank of the first brush head within the bushing.

16. The grill brush assembly of claim 9, wherein the handle comprises wood, plastic, bamboo, or metal.

17. The grill brush assembly of claim 9, wherein the handle comprises a first portion that is removably attached to a second portion, and the second portion is configured to receive the first brush head.

* * * * *

UNITED STATES PATENT AND TRADEMARK OFFICE
CERTIFICATE OF CORRECTION

| | |
|---|---|
| PATENT NO. | : 10,239,095 B2 |
| APPLICATION NO. | : 15/264402 |
| DATED | : March 26, 2019 |
| INVENTOR(S) | : Douglas C. Shereck |

It is certified that error appears in the above-identified patent and that said Letters Patent is hereby corrected as shown below:

In the Claims

Column 10, Claim 13, Line 45, please insert --with-- after associated.

Signed and Sealed this
Twenty-first Day of May, 2019

Andrei Iancu
*Director of the United States Patent and Trademark Office*